United States Patent
Adams

(10) Patent No.: US 9,215,726 B1
(45) Date of Patent: Dec. 15, 2015

(54) LOW LATENCY WIRELESS MESSAGING

(71) Applicant: Spectranet, Inc., Seattle, WA (US)

(72) Inventor: Jeffrey C. Adams, Seattle, WA (US)

(73) Assignee: SpectraNet, Inc., Seattle, WA (US)

( * ) Notice: Subject to any disclaimer, the term of this patent is extended or adjusted under 35 U.S.C. 154(b) by 212 days.

(21) Appl. No.: 13/948,081

(22) Filed: Jul. 22, 2013

Related U.S. Application Data

(60) Provisional application No. 61/675,288, filed on Jul. 24, 2012.

(51) Int. Cl.
  *H04J 1/16* (2006.01)
  *H04W 72/10* (2009.01)

(52) U.S. Cl.
  CPC .................................... *H04W 72/10* (2013.01)

(58) Field of Classification Search
  USPC ................. 370/229, 230, 236, 252, 330, 389, 370/395.21, 465, 474, 476
  See application file for complete search history.

(56) References Cited

U.S. PATENT DOCUMENTS

| | | | | |
|---|---|---|---|---|
| 6,104,712 | A * | 8/2000 | Robert et al. | 370/389 |
| 8,542,763 | B2 * | 9/2013 | Forenza et al. | 375/267 |
| 8,654,815 | B1 * | 2/2014 | Forenza et al. | 375/141 |
| 2002/0184645 | A1 * | 12/2002 | Austin et al. | 725/107 |
| 2002/0198657 | A1 * | 12/2002 | Robbins | 701/214 |
| 2007/0147251 | A1 * | 6/2007 | Monsen | 370/235 |
| 2008/0002882 | A1 * | 1/2008 | Voloshynovskyy et al. | 382/181 |
| 2008/0129591 | A1 * | 6/2008 | Lamance et al. | 342/357.12 |
| 2009/0300469 | A1 * | 12/2009 | Rajakarunanayake | 714/776 |
| 2013/0091214 | A1 * | 4/2013 | Kellerman et al. | 709/204 |
| 2013/0132796 | A1 * | 5/2013 | Vummintala et al. | 714/758 |

OTHER PUBLICATIONS

Liu, Chunxu, et al., Modeling M(3000)F2 based on empirical orthogonal function analysis method, Radio Science vol. 43, Issue 1, doi:10.1029/2007RS003694, American Geophysical Union, Washington DC, USA, 2008, 8 pages.

Guimaraes, Dayan Adionel, Contributions to the Understanding of the MSK Modulation, Dec. 9, 2006, 13 pages.

Phillips, Matthew, High-Speed Trading: My Laser is Faster Than Your Laser, Bloomberg Businessweek, Apr. 23, 2012, http://www.businessweek.com/articles/2012-04-23/high-speed-trading-my-laser-is-faster-than-your-laser, 2 pages.

ITU-R, Method for the prediction of the performance of HF circuits, Recommendation ITU-R P.533-10, Oct. 2009, 26 pages, ITU, Geneva, Switzerland.

NCDXF-IARU, International Beacon Project—Transmission Schedule, Jun. 6, 2012, http://web.archive.org/web/20120606205744/http://www.ncdxf.org/beacon/beaconSchedule.html, 3 pages.

Zhang, Man-Lian et al., Evaluation of global modeling of M(3000)F2 and hmF2 based on alternative empirical orthogonal function expansions, Advances in Space Research, Oct. 15, 2010, pp. 1024-1031, vol. 46, Issue 8, Science Direct, Elsevier, Philadelphia, USA.

\* cited by examiner

*Primary Examiner* — Kwang B Yao
*Assistant Examiner* — Nguyen Ngo
(74) *Attorney, Agent, or Firm* — Chin IP, PLLC; Davin Chin

(57) ABSTRACT

Technology for wireless transmission of messages to remote receiving devices is disclosed. The technology includes receiving a message for transmission, determining transmission parameters for transmission of the message, and transmitting the message to a remote receiving device according to the determined transmission parameters. The technology may also include encoding the message to effect message latency and may be employed for message transmission via the ionosphere or other atmospheric layer at frequencies in the Medium Frequency (MF), High Frequency (HF), or Very High Frequency (VHF) spectrum. Further, the disclosed technology may be employed for message transmission to effect low latency financial transaction execution, such as high speed high frequency trading.

20 Claims, 9 Drawing Sheets

| Trading Symbol | Encoded Representation | Encoded Transaction Type<br><br>Buy = 1<br>Sell = 0 | Encoded Quantity<br><br><br>00 = 1,000<br>01 = 5,000<br>10 = 10,000<br>11 = 50,000 | Encoded Message |
|---|---|---|---|---|
| ABC | 000 | 1 | 01 | 000101 |
| DEF | 010 | 1 | 10 | 010110 |
| GHI | 011 | 0 | 11 | 011011 |
| JKL | 101 | 0 | 10 | 101010 |
| MNP | 110 | 0 | 11 | 110011 |

Table 1: Examples of Encoded Messages

*FIG. 6*

| Trading Symbol Sequences | Encoded Representation | Encoded Transaction Type | Encoded Quantity | Encoded Message |
|---|---|---|---|---|
| | | Buy = 1
Sell = 0 | 00 = 1,000
01 = 5,000
10 = 10,000
11 = 50,000 | |
| *ABC*, DEF, GHI | 100 | 1 | 01 | 100101 |
| ABC, *DEF*, GHI | 100 | 1 | 10 | 100110 |
| ABC, DEF, *GHI* | 001 | 0 | 11 | 001011 |

Table 2: Additional Examples of Encoded Messages

*FIG. 7*

| Time of Day | Trading Symbol | Encoded Transaction Type<br><br>Buy = 1<br>Sell = 0 | Encoded Quantity<br><br>00 = 1,000<br>01 = 5,000<br>10 = 10,000<br>11 = 50,000 | Encoded Message |
|---|---|---|---|---|
| 10:00:10 | ABC | 1 | 01 | 101 |
| 10:00:20 | DEF | 1 | 10 | 110 |
| 10:00:30 | GHI | 0 | 11 | 011 |
| 10:00:40 | JKL | 1 | 00 | 100 |
| 10:00:50 | MNP | 0 | 00 | 000 |
| 10:01:00 | XYZ | 0 | 11 | 011 |

Table 3: Additional Examples of Encoded Message

*FIG. 8*

LOW LATENCY WIRELESS MESSAGING

CROSS REFERENCE TO RELATED APPLICATION

This application claims priority to U.S. Provisional Pat. App. No. 61/675,288 filed on Jul. 24, 2012 entitled "Apparatus and Method for Low Latency Wireless Messaging". The entirety of this afore-mentioned application is incorporated herein by reference.

BACKGROUND

Data consumption has been increasing at a rapid rate in recent years. As part of this increase, consumers are demanding increased bandwidth and service providers are scrambling to improve communication network infrastructure and services. For example, as of 2013, Long Term Evolution (LTE) boasts downlink peak data rates that can exceed 100 Mbit/s. Likewise, Mobile Worldwide Interoperability for Microwave Access (WiMax) release 2 supports a per site downlink of 120 Mbit/s, and Data over Cable Interface Specification (DOCSIS) 3.0 supports a downlink of up to 160 Mbit/s. Delivery of such high data throughput has been made possible by, among other things, better bandwidth allocation, higher order modulation, and shorter transmission time intervals. Consumers also tend to expect their data communications to be secure and uncorrupted. Thus, better encryption and channel coding techniques have emerged.

Most consumers, however, are less interested in communication latency because many applications can tolerate significant latency (e.g., milliseconds or even seconds of latency) without degrading the consumers' experience. Consumers have long grown accustomed to delayed delivery of data, such as emails and text messages, as these types of data are generally routed through several networks, which are sometimes located in multiple continents, before reaching their destination.

Other consumers, however, may favor a communication system with low latency as it may provide certain advantages. For these consumers, a latency difference, for example, of tens of microseconds could translate to revenue differences of millions of dollars.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale.

For a better understanding of the present invention, reference will be made to the following Detailed Description, which is to be read in association with the accompanying drawings, wherein:

FIG. 6 is a table of message encoding examples according to aspects of the technology;

FIG. 7 is another table of message encoding examples according to aspects of the technology;

FIG. 8 is yet another table of message encoding examples according to aspects of the technology.

DETAILED DESCRIPTION

Figure 1:
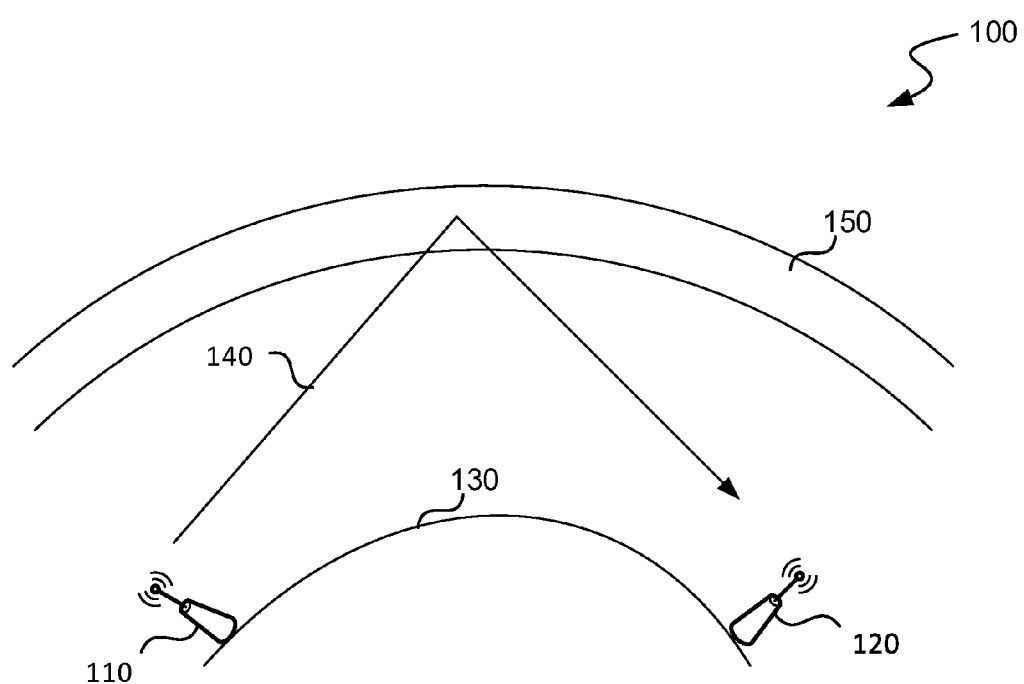
FIG. 1 is a diagram illustrating one example of a suitable environment in which aspects of the technology may be employed.

The following description provides specific details for a thorough understanding of, and enabling description for, various embodiments of the technology. One skilled in the art will understand that the technology may be practiced without many of these details. In some instances, well-known structures and functions have not been shown or described in detail to avoid unnecessarily obscuring the description of embodiments of the technology. It is intended that the terminology used in this disclosure be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section. For example, the term "based on" or "based upon" is not exclusive and is equivalent to the term "based, at least in part, on" and includes being based on additional factors, some of which are not described herein. References in the singular are made merely for clarity of reading and include plural references unless plural references are specifically excluded. The term "or" is an inclusive "or" operator and is equivalent to the term "and/or" unless specifically indicated otherwise. As used herein, the terms "component" and "system" are intended to encompass hardware, software, or various combinations of hardware and software. Thus, for example, a system or component may be a process, a process executing on a computing device, the computing device, or a portion thereof.

Introduction

Technology for wireless transmission of messages to remote receiving devices is disclosed. The disclosed technology includes receiving a message for transmission, determining transmission parameters for transmission of the message, and transmitting the message to a remote receiving device according to the determined transmission parameters. The disclosed technology may also include encoding the message to effect message latency and may be employed for message transmission via the ionosphere or other atmospheric layers at frequencies in the Medium Frequency (MF), High Frequency (HF), or Very High Frequency (VHF) spectrum.

The disclosed technology may include determining one or more of the following transmission parameters: frequency for transmission of the message (e.g., a carrier frequency, a center frequency, etc.), modulation type for transmission of the message, power level for transmission of the message (e.g., a transmitter output power, an effective radiated power level, etc.), transmission bit rate, transmission order, sampling rate, buffer size, transmission time for transmission of the message (e.g., time of day, portion of a solar cycle, etc.), and/or the like. A determination of one transmission parameter may also influence determination of other transmission parameters. These and other transmission parameters may also be determined to effect latency for the transmission (e.g., to reduce latency) and/or be based on predefined channel bandwidth requirements. In one example, the disclosed technology is employed to determine transmission parameters that minimize message latency while still meeting predetermined channel bandwidth requirements.

As one non-limiting example, the disclosed technology may include determining a transmission frequency that falls within the HF spectrum as the frequency for transmitting the message to a receiving device. A message transmitted at this frequency may propagate from its origin to the ionosphere and be refracted back towards its destination. In this example, the destination is located at a remote distance from the origin, for example hundreds of miles away.

A transmission in the HF spectrum may be regulated by one or more government agencies. For example, in the United States, the Federal Communication Commission (FCC) regulates spectrum use and may define channel bandwidth limits for transmissions in certain spectrums. As an example, the FCC sets a predefined maximum channel bandwidth of 2.8 KHz for transmission frequencies in the HF spectrum. In one example, the disclosed technology includes determining transmission parameters for transmitting a message in the HF spectrum based at least on this predefined channel bandwidth. In another example, the predefined channel bandwidth may be used by the disclosed technology to determine a modulation type for transmission of the message. However, yet other examples may be different. Transmissions in the HF spectrum may be possible under a commercial license, experimental license, or in HF spectrum such as licensed to HySky Technologies Inc., of Atlanta, Ga.

The disclosed technology may be employed, for example, in a computing device that includes a front end unit, a controller, and a transmitter. The front end unit in this example is adapted to receive messages, such as requests for financial transactions. The controller may include multiple determinators that are respectively adapted to determine transmission parameters such as carrier frequency, modulation type, transmission power, sample rates, and buffer sizes, e.g., to effect latency. The controller may also include other determinators that are respectively adapted to determine transmission order, transmission bit rate, and other transmission parameters. The transmitter may be adapted to transmit messages with the transmission parameters determined by the controller.

The disclosed technology may be employed to transmit messages relating to financial transactions, such as High Frequency Trading (HFT) transactions. For example, HFT technology may include the use of computing devices to move into and out of financial positions in fractions of a second. In such a field, tens of microseconds of latency difference for getting a trade to market may be relevant to a trader.

In the world of HFT, traders leverage highly frequent price fluctuations on exchanges, even though such fluctuations may be relatively small. In general, the objective of an HFT trader is to be the first or fastest trader, or at least equally as fast as other traders, to get an order to market or to an exchange. Getting a piece of competitive intelligence or other information, or completing a trade a few milliseconds faster than other traders may be worth tens of millions of dollars to a trader. In this and other applications, various aspects of the disclosed technology may be employed to reduce message latency.

Illustrative Operating Environments/Devices

FIG. 1 is a diagram of environment 100 in which aspects of the technology may be practiced. As shown, environment 100 includes transmitting device 110 and receiving device 120. Receiving device 120 may be located hundreds of miles away from transmitting device 110. As one non-limiting example, transmitting device 110 is adapted to transmit messages to receiving device 120 via Radio Frequency (RF) transmission 140 that is at least partially propagated and/or refracted through ionosphere 150.

Transmitting device 110 and receiving device 120 may be virtually any type of general- or specific-purpose computing devices that are respectively capable of transmitting and receiving messages via RF signals. Such computing devices may be user devices such as desktop computers, laptop computers, and the like, or server devices such as server computers, virtual computing host computers, and the like. As further examples, transmitting device 110 and receiving devices 120 may be specific-purpose computing devices such as HFT servers, supercomputers running specialized HFT processes, and the like. The computing devices may further include or be coupled to one or more external radios and/or antennas, or include radios and/or antennas.

As illustrated in FIG. 1, transmitting device 110 launches RF transmission 140 at a certain angle. Once launched, RF transmission 140, carrying a message, propagates to ionosphere 150 and at least partially refracts back to earth 130 before reaching receiving device 120 at a location remote from transmitting device 110. As illustrated in FIG. 1, the message may be received at receiving device 120. Due to various factors, the message may be received at receiving device 120 at some point in time after it was transmitted by transmitting device 110. This delay may be referred to as "message latency."

As used herein, "message latency" refers the length of time it takes a particular message to traverse a system, and in a communication system, generally refers to the time it takes for a particular message to get from a point of origin to a point of destination. Message latency depends on factors such as the speed of the transmission medium and delays associated with devices in the communication system. In various communication systems of the disclosed technology, real time or almost instantaneous communications may be desirable and message latency may be a specific consideration. As used herein, "message latency" includes at least two components: message size latency and propagation latency. In the environment of FIG. 1, message latency depends on the size of the message carried by RF transmission 140 and the propagation latency associated with RF transmission 140.

As used herein, "message size latency" refers to latency or delay that is associated with the size of the message. Message size latency may also include the time it takes transmitting device 110 and/or receiving device 120 to assemble and/or disassemble the bits that make up a message, and the time it takes to buffer the bits of the message. Message size latency may be linearly proportional to the size of the message, for example, in systems where bits of a message are serially processed. In these and other systems, changing the number of bits in a message contains may cause a linearly proportional change in message size latency. As such, any operation that changes the number of bits in a message such as channel coding (e.g., error correction coding, error detection coding, etc.), interleaving, redundancy, or encryption, may cause a corresponding change in message size latency.

In one non-limiting example, the raw bits representing a message (i.e., the bits representing an originally received message, without error correction or encryption) are transmitted in RF transmission 140 to effect low message size latency. However, encoding the originally received message into a fewer number of bits may further reduce message size latency. For example, a "buy 1,000 IBM" message requesting a financial transaction may be received at transmitting device 110 for transmission to receiving device 120. As received, this message may include more than 100 bits. However, this received message may be encoded to a smaller number of bits, for example, six bits "010100," where the first three bits, "010," represent the security, "IBM," the fourth bit, "1," represents a transaction, "buy," and the last two bits, "00," represents a transaction quantity of "1,000." In such an example, the encoding and/or the meaning of the various bits may be known to the receiving device 120, e.g., known a priori. The number of bits in such an encoded message is less than the number of bits in the originally received message; therefore the message size latency associated with transmitting the encoded message may be substantially less than that associated with transmitting the originally received message.

While the size of a transmitted message may be linearly proportional to the message size latency, it may be inversely proportional to the resulting signal channel bandwidth if the data rate between transmitting device 110 and receiving device 120 is not constrained (i.e. a small number of bits transmitted at a high data rate may be associated with a relatively large channel bandwidth.) In one example, the disclosed technology is employed to determine a number of bits for an encoded message and to determine an appropriate transmission data rate such that transmission of the encoded message remains within a predefined channel bandwidth, given a certain modulation type.

As used herein, "propagation latency" refers to the time it takes for a given bit to propagate from the point of origin to the point of destination. Propagation latency may include any latency caused by the radios, amplifiers, antennas, and any other equipment associated with transmission and reception of the message. Propagation latency may also depend on the transmission medium. As one example, propagation latency may include, or be substantially based on, what is commonly referred to as time-of-flight, air propagation, channel delay, transmission delay, or channel latency.

As illustrated in FIG. 1, RF transmission 140 propagates and refracts at or in ionosphere 150. Such propagation and refraction is generally due to differing electron densities at the various layers of ionosphere 150. In this example, the electron density at each of these layers varies with time of day, time of a solar cycle, and/or with time of year. However, the disclosed technology includes various aspects for estimating time-of-flight, and thus for estimating propagation latency, based on several variables. For example, these variables may include the carrier frequency of RF transmission 140, the elevation angle of RF transmission 140, the number of earth/ionospheric bounces between transmitting device 110 and receiving device 120, the number of transmitter/receiver hops between transmitting device 110 and receiving device 120, the time of day, and the distance associated with the bounces. Minimizing the time-of-flight, and thus the propagation latency, of RF transmission 140 via ionosphere 150, therefore, may involve directly or indirectly selecting, influencing, or otherwise controlling values for some or all these variables.

In one example, RF transmission 140 is transmitted with a modulation type that was determined based on a predefined channel bandwidth requirement given a size of a transmitted message. Because different modulation types are typically associated with different spectral emissions, the determination may include selecting a modulation type with a spectral emission that falls within a predefined channel bandwidth. Examples of potentially suitable modulation types available as a transmission parameter include minimum shift keying (MSK), On-Off keying (OOK), phase shift keying (PSK), M-PSK (e.g., PSK of a higher order than Binary PSK), and/or the like. While certain examples are provided in this paragraph, other modulation types may also be potentially suitable.

As noted above, transmission power may also be one of the transmission parameters determined based on message latency and a predefined channel bandwidth. In such an example, transmitter device 110 may be adapted to transmit a message that contains no error correction at a relatively higher transmission power, e.g., to increase the Signal to Noise Ratio (SNR) of RF transmission 140 relative to that of a lower power transmission. The relatively higher transmission power in this example may compensate for the lack of error correction in the transmitted message and provide for reliability that is at least somewhat comparable to the SNR that would have been provided by error correction.

In another example, a message without error correction bits may be transmitted in multiple RF transmissions, e.g., on two or more separate/different frequencies for redundancy. In such an example, receiving device 120 may receive these transmissions and detect errors by comparing the received transmissions.

FIG. 1 is also illustrative of other environments in which the disclosed technology may be employed. For example, RF transmission 140 may be a transmission in the MF spectrum, HF spectrum, or VHF spectrum, or be a tropospheric transmission. Also, RF transmissions in the HF spectrum are also known as skywave transmissions, i.e. due to at least partial propagation of these RF transmissions via refraction from ionosphere 150 to other points on earth 130. Skywave transmissions may be distinguished from ground wave transmissions, i.e., propagation of a low frequency RF transmissions (generally below 2 MHz) relatively near the surface of earth 130, may be between approximately 3 MHz and 30 MHz, and may employ a carrier frequency. Various aspects of the disclosed technology may be employed with Skywave transmissions, ground wave transmissions, and/or other suitable transmissions.

Figure 2:
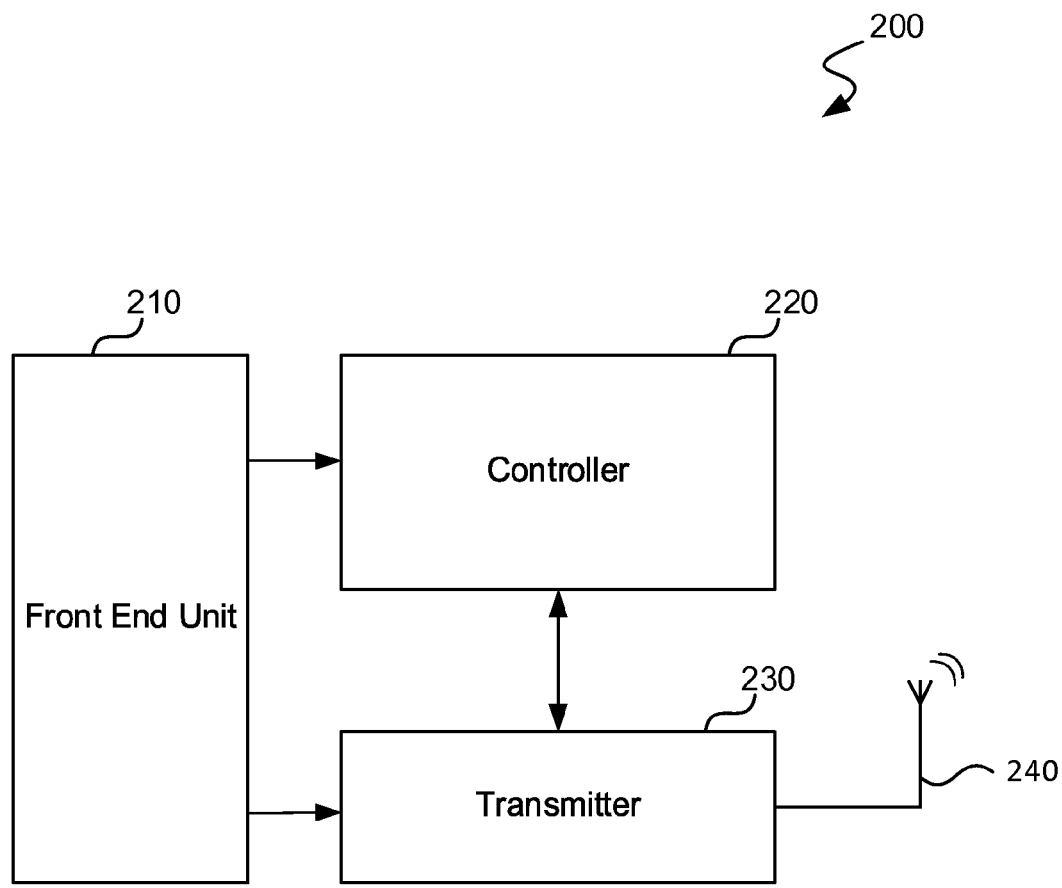
FIG. 2 is a block diagram illustrating functional blocks of a computing device in which aspects of the technology may be employed.

FIG. 2 is a block diagram illustrating functional blocks of transmitting device 200, which may be an example of transmitting device 110 in FIG. 1. As illustrated, transmitting device 200 is a computing device that includes front end unit 210, controller 220, transmitter 230, and antenna 240. Transmitting device 200 may also include a data storage memory (not shown in FIG. 2). Controller 220 may be coupled to front end unit 210 and to transmitter 230. Antenna 240 may be coupled to transmitter 230, or transmitter 230 may include an integrated antenna. Transmitting device 200 may also include other, additional, or fewer components. In one example, transmitting device 200 is adapted to transmit messages to receiving devices at locations remote from transmitting device 200.

In one example, front end unit 210 is adapted/configured to receive messages for wireless transmission to one or more remote receiving devices. The received message may be or include a request for a financial transaction, a request for information, information, a status, and the like. The received message may be received from a user or from another computing device. Transmitting device 200 may also be adapted to internally generate the received message.

In the examples where messages are received by transmitting device 200, messages may be received at front end unit 210 via a user entry device, such as a keyboard, a pointing device, a touch pad, a camera, or a microphone. However, messages may also be received via other types of user entry devices. Likewise, messages from another computing device may be received at front end unit 210 via a communication port coupled to the other computing device, e.g., via a wireless or wired communication network. Further, transmitting device 200 itself may generate messages, e.g., as a result of an execution of an internal process.

Front end unit 210 may be further adapted to extract information from the received message, and the extracted information may include (1) a transaction type, such as buy or sell, (2) a representation of a security or financial instrument of interest, and/or (3) a quantity. Other information may also be extracted from the received message by front end unit 210.

Front end unit 210 may also be adapted to encode the received message for low latency message transmission, for example, by (1) encoding each extracted information into a bit or sequence of bits, and (2) concatenating the bits and/or sequences into a predefined order, thus generating an encoded message. In one example, the predefined order may start with a sequence of bits representing a trading symbol of interest, followed by a bit or sequence of bits of the encoded transaction type, and a sequence of bits of the encoded quantity. Different orders of sequences of bits are also possible. For example, the encoded transaction type may be the first bit or sequence in the encoded message, followed by a bit or sequence representing a security of interest, and a bit or sequence representing a quantity.

Front end unit 210 may use a look up table (LUT) to encode the information of the received message, with the LUT associating each information with a particular bit or sequence of bits. Front end unit 210 may also encode the received message based on a predefined rule for manipulating the bits in the received message.

In one example, controller 220 is adapted to receive information regarding the encoded message such as the size of the encoded message (i.e., the number of bits in the encoded message). This size may be the same as that of the received message (e.g., if front end unit 210 makes no changes to the number of bits) or may be different than that of the received message. Controller 220 may be further adapted to receive information regarding a predefined channel bandwidth, based upon which controller 220 may determine transmission parameters for transmission of the encoded message.

Figure 3:
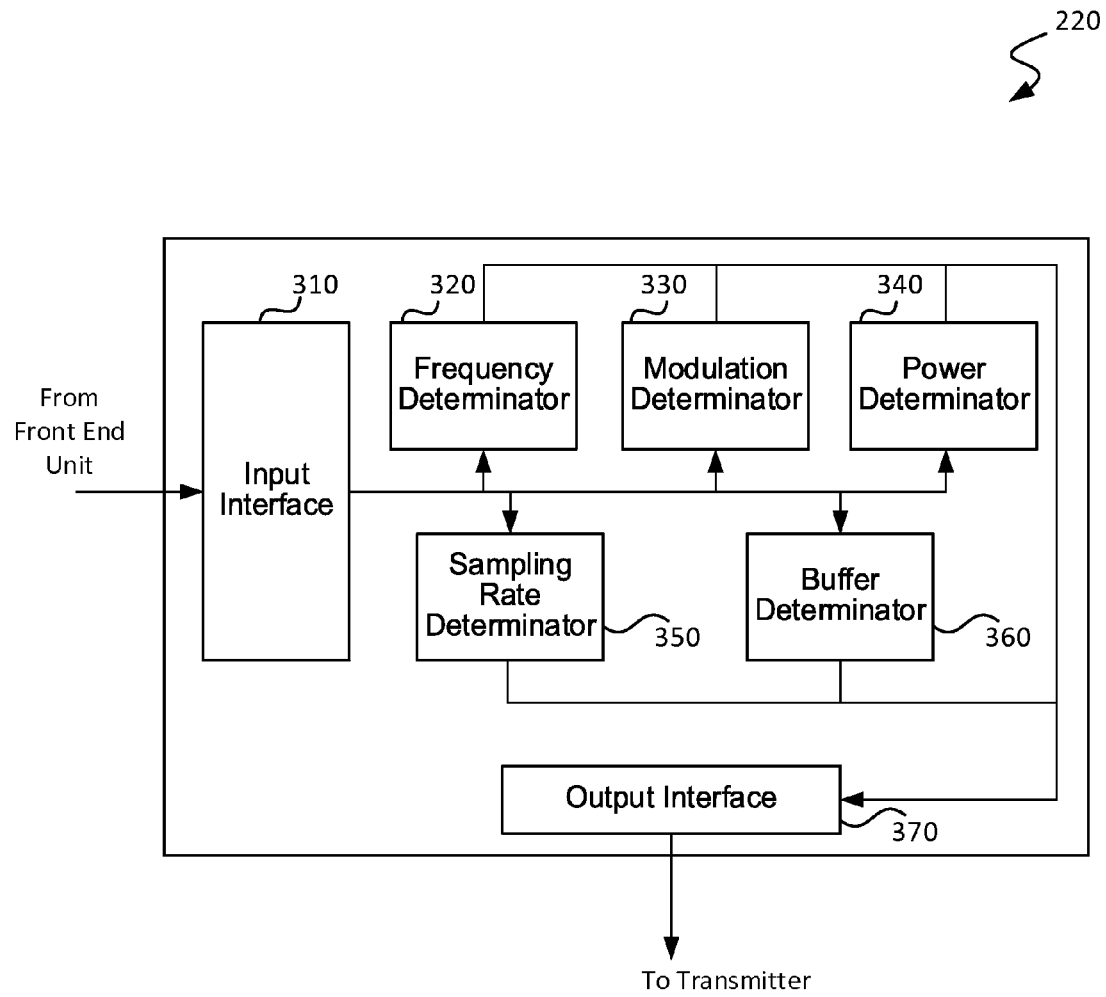
FIG. 3 is a block diagram illustrating functional blocks of controller 220 of FIG. 2.

Referring to FIG. 3, a block diagram illustrating functional blocks of controller 220 of FIG. 2 is shown. In FIG. 3, controller 220 includes an input interface (IIF) 310, frequency determinator 320, modulation determinator 330, power determinator 340, sampling rate determinator 350, buffer determinator 360, and output interface 370. Controller 220 may also include other determinators such as a message latency determinator (not shown), transmission rate determinator (not shown), transmission order determinator (not shown), and the like. A "determinator" as used in the specification refers to hardware, software, firmware, or a combination thereof that is adapted to make determinations of values based on input to the determinator. Input to a determinator may be information retrieved from data storage memory (e.g., memory location) in transmitting device 200, information from within the transmitting device 200, or information derived from other information received at transmitting device 200. For example, such information may include a predefined bandwidth, a date, a time of day, an antenna height, an elevation angle, a number of repeaters, distance to/between repeaters, the speed of light, topography, and the like. As one example, controller 220 is adapted and/or configured to determine transmission parameters for the low latency wireless transmission of the message through at least a portion of an ionospheric layer and/or a tropospheric layer based at least on (a) message latency and on (b) a predefined channel bandwidth.

In one example, IIF 310 is adapted to receive, from front end unit 210 (FIG. 2), information associated with the encoded message for transmission, for example, the size of the message, and to provide the received information to one or more determinators of controller 220. IIF 310 may also be adapted to receive other information pertinent to determination of the outputs of the various determinators, and to forward such information to the appropriate determinator(s) and/or other components of transmitting device 200.

In one example, frequency determinator 320 is adapted to determine a carrier frequency to be used for transmission of the encoded message, modulation determinator 330 is adapted to select a modulation type for the encoded message, power determinator 340 is adapted to determine the amount of power for transmission of the encoded message, sampling rate determinator 350 is adapted to determine a sampling rate for the encoded message, and buffer determinator 360 is adapted to determine the size of a buffer for holding the encoded message. Further, modulation determinator 330 may select a modulation type from MSK, OOK, Frequency Shift Keying (FSK), Quadrature Amplitude Modulation (QAM), PSK, from other modulation protocols such as STANAG 4539, single sideband (SSB), continuous wave (CW), or the like. In one example, modulation determinator 330 may also be adapted to determine whether modulation is to be coherent or non coherent. The determined transmission parameters may be provided to output interface 370.

In one example, determinators 320-360 may also be adapted to base their respective outputs on estimated message size latency for the encoded message. For example, such an estimate may be based on the number of bits contained in the encoded message. Further, such determinations may be performed by any of determinators 320-360, or information regarding such determinations may be received from another component or device.

In addition, determinators 320-360 may also be adapted to base their respective outputs on estimated time-of-flight. For example, such an estimate may be based on the following equation:

$$\tau = \frac{2Ro}{c} \sum_{1}^{n} \left[ \frac{\sin\frac{d}{2Ro}}{\cos\left(\Delta + \frac{d}{2Ro}\right)} \right] \times 10^3,$$

where $\tau$ is the time of flight, c is the speed of light, n is a number of ionospheric hops between transmitting device 110 and receiving device 120, d is a length of a hop, $\Delta$ is an elevation angle, and Ro is the radius of the earth. The elevation angle, $\Delta$, is given by $$\Delta = \tan^{-1}\left(\cot\frac{d}{2R_0} - \frac{R_0}{R_0 + h_r}\csc\frac{d}{2R_0}\right),$$

where $h_r$ is an equivalent plane-mirror reflection height. In one example, $h_r$ is 110 km for E modes. In another example, $h_r$ is given by $$h_r = \frac{1490}{M(300)F2} - 176 \text{ or } 500 \text{ km},$$

whichever is smaller.

Also, the message latency, T, may be defined according to:

$$T = \frac{2Ro}{c} \sum_{1}^{n} \left[ \frac{\sin\frac{d}{2Ro}}{\cos\left(\Delta + \frac{d}{2Ro}\right)} \right] \times 10^3 + \tau_1 + \tau_2$$

where τ1 is latency due to message length, and τ2 is latency inherent in components of a communication system for transmission of the encoded message. As with determination of message size latency, determination of propagation latency may be performed by any of determinators 320-360, or information regarding such determinations may be received from another component or device.

In one example, output interface 370 is coupled to transmitter 230 (FIG. 2) and output interface 370 is adapted to send determined transmission parameters to transmitter 230. Output interface 370 may also be coupled to a display device, a computing device, an audio device, or other components. Output interface 370 may include hardware, software, firmware, or any combination thereof that enable conversion of the determined transmission parameters to a format suitable for use by transmitter 230 or other component. Alternately, output interface 370 may be a pass through that forwards determined parameters from the various determinators without modification.

Referring back to FIG. 2, transmitter 230 is coupled to front end unit 210 and to controller 220, and is adapted to receive the encoded message and determined transmission parameters. Transmitter 230 is further adapted/configured to transmit the encoded message based on the determined transmission parameters, for example to receiving device 120 (FIG. 1) through at least a portion of an ionospheric layer and/or a tropospheric layer. Transmitter 230 may include a carrier signal generator, a modulator, a power amplifier, a filter, and a matching network. However, transmitter 230 may include other, additional, or fewer components.

In one example, transmitter 230 receives indications of a determined carrier frequency, a determined modulation type, and a determined transmission power from controller 220. The carrier signal generator may be adapted to generate a carrier signal for the message based on the determined carrier frequency, the modulator may be adapted to modulate the encoded message based on the determined modulation type, and the power amplifier may be adapted to amplify the modulated message based on the determined transmission power. The power amplifier may be further adapted to drive a transmitting antenna, such as antenna 240.

Illustrative Processes

For clarity, the processes described herein are described in terms of operations performed in particular sequences by particular devices or components of a system. However, it is noted that other processes are not limited to the stated sequences, devices, or components. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into the described processes or other processes, whether or not that technology is specifically described in conjunction with a process. The disclosed processes may also be performed on or by other devices, components, or systems, whether or not such devices, components, or systems are described herein. These processes may also be embodied in a variety of ways.

For example, they may be embodied on an article of manufacture, e.g., as computer-readable instructions stored in a computer-readable storage medium or be performed as a computer-implemented process. As an alternate example, these processes may be encoded as computer-executable instructions and transmitted via a communications medium.

Figure 4:
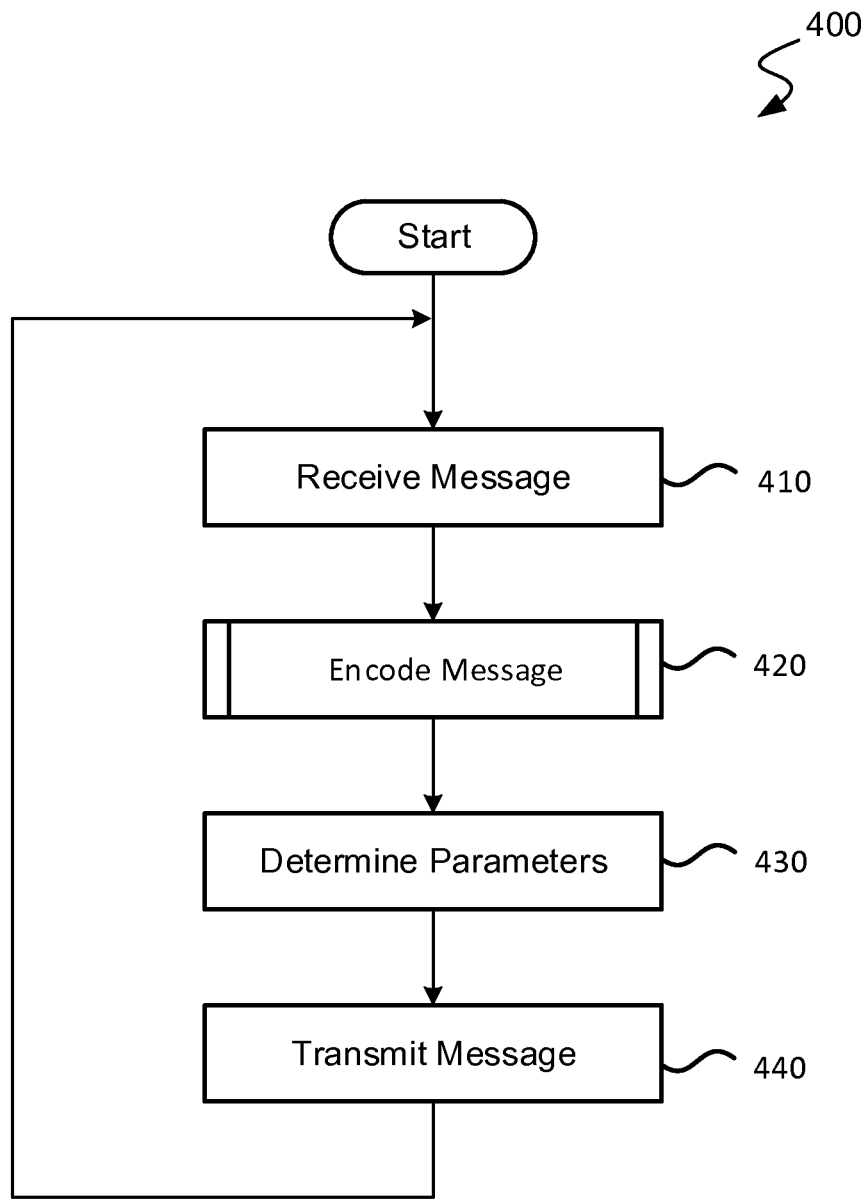
FIG. 4 is logical flow diagram illustrating a process for transmitting messages according to aspects of the technology.

FIG. 4 is a logical flow diagram illustrating process 400 for low latency message transmission. Low latency wireless transmission process 400 begins at 410 where a transmitting device, for example, transmitting device 110, receives a message for transmission. In one example, a front end unit of a transmitting device receives the message for transmission to a remote receiving device. The message may be received from a user. However, the message may also be received from another computing device or be internally generated by the transmitting device.

Process 400 continues to 420 where the received message is encoded. As one example, front end unit 210 encodes the received message into a sequence of bits derived to reduce message latency, e.g., the sequence of bits of the encoded message contains fewer bits than the received message. As previously discussed, inclusion of fewer bits is associated with a smaller message size, and thus may reduce message size latency.

Figure 5:
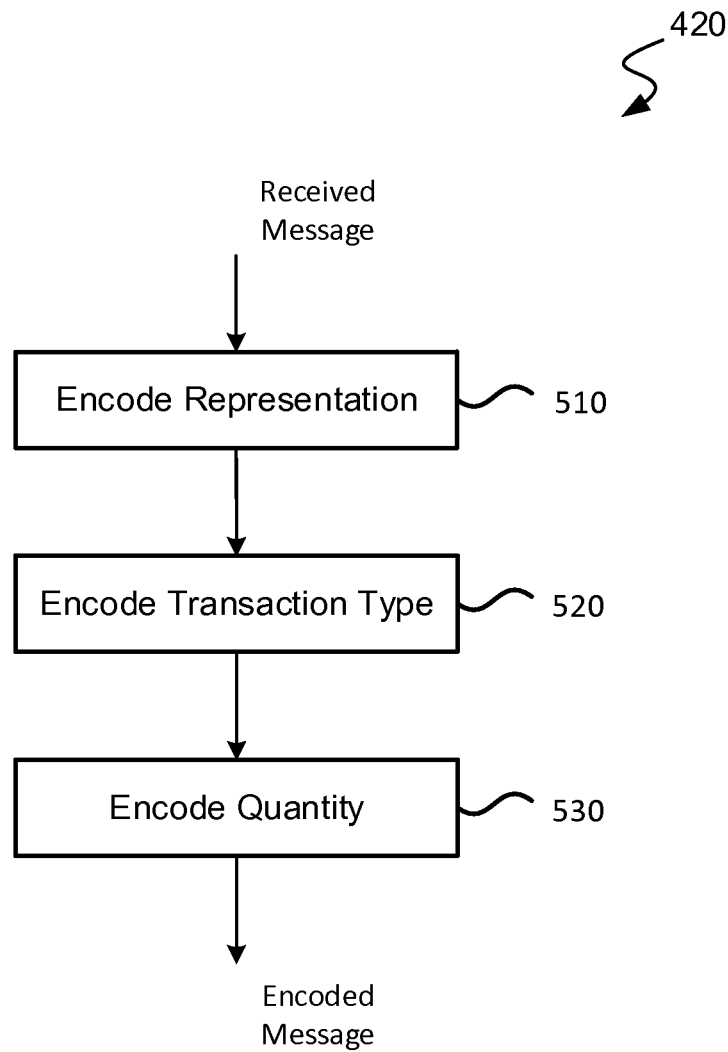
FIG. 5 is a logical flow diagram illustrating a process for encoding messages according to aspects of the technology.

An example of a process of 420 is illustrated in the logical flow diagram of FIG. 5. As illustrated in FIG. 5, process 420 starts at 510 where a representation (e.g., a trading symbol or other representation of a stock, bond, forward, future, option, or other security or financial product, etc.) is encoded as a sequence of bits. In one example, three bits are used to represent up to eight different trading symbols. A combination of n bits may be used to represent up to $2^n$ different trading symbols and these bit combinations may be known a priori by the receiving device. The sequence of bits encoding each trading symbol may be static or dynamic, and they may be known to both the transmitting device and the receiving device.

In another example, the number of bits in a sequence of bits representing a trading symbol is the same as the number of different trading symbol of interest. In this example, three trading symbol of interest are arranged serially in a particular order. Each security is then represented by a sequence of three bits with only one of the bits being a "1," the rest being "0," where the location of the "1" bit in the sequence corresponds to the position of the trading symbol in the arrangement. For example, if trading symbol A, B, and C are used in an example system, and are arranged as A, B, C; trading symbol A may be represented as "100," B as "010," and C as "001."

In yet another example, each trading symbol is represented by a particular transmission time. In this example, trading symbol A is represented by a transmission at 10:00:10 AM, and trading symbol B is represented by a transmission at 10:00:40 AM. Thus, a message transmission originated at 10:00:10 AM by transmitting device 110 in this example is interpreted by the receiving device as a message associated with trading symbol A.

Returning to FIG. 5, process 420 moves to 520 where a transaction type, such as "sell" or "buy," is encoded as a bit or a sequence of bits. With two possible transaction types, one bit encoding may be sufficient, e.g., "1" for buy and "0" for sell. However, other types of transactions, such as limit orders, stop loss orders, or other transaction types may be employed in some environments. Thus, sequences of bits may be assigned to encode these other transaction types. As with the representations, the bit or sequence of bits encoding a transaction type may be may be static or dynamic and be known to both the transmitting device and the receiving device.

From 520, process 420 proceeds to 530 where each quantity of interest is encoded as a sequence of bits. Quantities of interest and their associated sequence of bits may be may be static or dynamic and may be known to both the transmitting device and the receiving device.

Although the example of process 420 is presented in one logical order of sub processes as illustrated in FIG. 5, there is no limitation as to the order of the sub processes of 420, e.g., 510, 520, and 530 may be performed in any order, or in parallel, or combinations thereof. The process of 420 may produce an encoded message, e.g., a message that is in a format derived to effect message latency.

Returning to FIG. 4, process 400 then flows to 430 where parameters for the transmission of the encoded message are determined. This determination may be done by controller 220 (FIG. 2) of transmitting device 110 (FIG. 1). As an example, controller 220 determines a carrier frequency, a modulation type, and a transmission power.

From 430, process 400 flows to 440 where the encoded message is transmitted according to the transmission parameters determined at 430. In one example, 440 includes transmitting the encoded message to an antenna, such as antenna 240 (FIG. 2). In another example, 440 includes generating a carrier signal, modulating the encoded message, and amplifying the modulated encoded message for transmission based on the transmission parameters determined at 430.

Illustrative Message Encodings

FIG. 6 is a table showing examples of encoded messages based on one implementation of 420 (FIG. 4). As shown in Table 1 of FIG. 6, a sequence of three bits represents an encoded trading symbol, one bit represents an encoded transaction type, and three bits represent the encoded quantity. In these examples, an encoded message is six bits. No channel coding, interleaving, redundancy, or encryption is employed for these examples.

FIG. 7 is a table showing additional examples of encoded messages based on another implementation of 420 (FIG. 4). As shown in Table 2 of FIG. 7, a sequence of three bits is used as an encoded representation of a trading symbol, one bit is used as a representation of the encoded transaction type, and three bits are used a representation of the encoded quantity.

FIG. 8 is a table showing yet other examples of encoded messages based on yet another implementation of 420 (FIG. 4). As shown in the Table 3 of FIG. 8, a time slot of the transmission represents a trading symbol of interest, one bit is used to encode the transaction type, and three bits are used to encode the quantity. In this implementation, a time out period may be implemented to prevent a receiving device from executing an erroneous trade if the encoded message is received outside its expected time slot.

Illustrative Computing Devices

Figure 9:
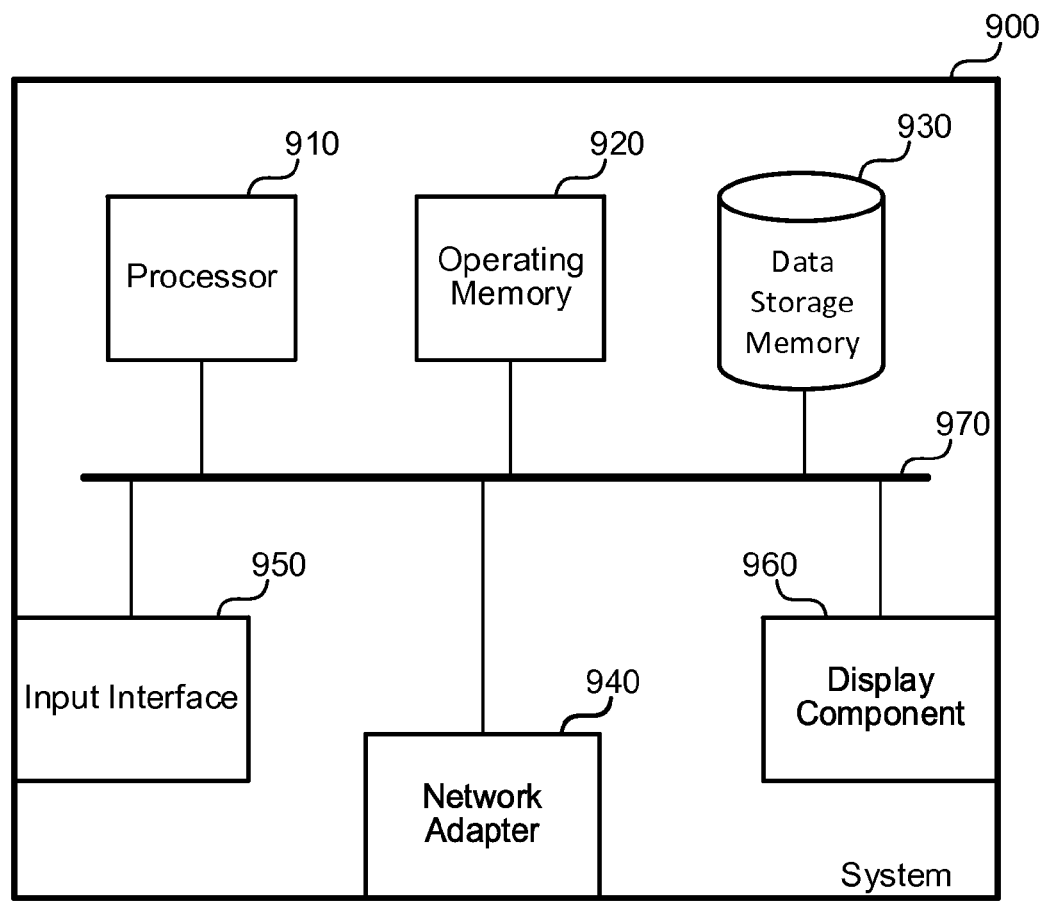
FIG. 9 is a block diagram illustrating example hardware components of a computing device in which aspects of the technology may be practiced.

FIG. 9 is a high-level illustration of example hardware components of computing device 900, which may be used to practice various aspects of the technology. For example, computing device 900 may be employed to perform process 400 of FIG. 4, and/or process 500 of FIG. 5. Computing device 900 may also be an embodiment of transmitting device 110 or receiving device 120 of FIG. 1, or an embodiment of transmitting device 200 of FIG. 2. As shown, computing device 900 includes processor 910, operating memory 920, data storage memory 930, network adapter 940, input interface 950, and display component 960. These aforementioned components may be interconnected by bus 970.

As with transmitting device 200, computing device 900 may be virtually any type of general- or specific-purpose computing device. For example, computing device 900 may be a user device such as a desktop computer, a laptop computer, a tablet computer, a display device, a camera, a printer, or a smartphone. Likewise, computing device 900 may also be server device such as an application server computer, a virtual computing host computer, or a file server computer.

Computing device 900 includes at least one processor 910 adapted to execute instructions, such as instructions for implementing the above-described processes or technology. The aforementioned instructions, along with other data (e.g., datasets, metadata, operating system instructions, etc.), may be stored in operating memory 920 and/or data storage memory 930. In one example, operating memory 920 is employed for run-time data storage while data storage memory 930 is employed for long-term data storage. However, each of operating memory 920 and data storage memory 930 may be employed for either run-time or long-term data storage. Each of operating memory 920 and data storage memory 930 may also include any of a variety of data storage devices/components, such as volatile memories, semi-volatile memories, non-volatile memories, random access memories, static memories, disks, disk drives, caches, buffers, or any other media that can be used to store information. However, operating memory 920 and data storage memory 930 specifically do not include or encompass communications media, any communications medium, or any signals per se.

Also, computing device 900 may include or be coupled to any type of computer-readable media such as computer-readable storage media (e.g., operating memory 920 and data storage memory 930) and communication media (e.g., communication signals and radio waves). While the term computer-readable storage media includes operating memory 920 and data storage memory 930, this term specifically excludes and does not encompass communications media, any communications medium, or any signals per se.

Computing device 900 also includes input interface 950, which may be adapted to enable computing device 900 to receive input from users or from other devices. In addition, computing device 900 includes a display component 960, which may be adapted to render displays. In one example, display component 960 includes a frame buffer, graphics processor, graphics accelerator, or a virtual computing host computer and is adapted to render the displays for presentation on a separate visual display device (e.g., a monitor, projector, virtual computing client computer, etc.). In another example, display component 960 includes a visual display device and is adapted to render and present the displays for viewing.

Another example of an implementation of the disclosed technology is a radio that leaves the bulk of message processing to an external processing unit, such as a central processing unit (CPU), a field programmable gate array (FPGA), or an application specific integrated circuit (ASIC). In this other example, message latency may include delays in communication between the external processing unit and the radio hardware, as well as delays due to interrupt configuration, radio hardware sampling, and message buffering.

In one example, a communication connection between the external processing unit and the radio may be selected based on latency. For example, Firewire 1394a is one example of a communication connection that contributes very little to message latency and thus may be employed. Other potentially suitable communication connections such as Gigabit Ethernet, Fibre Channel, and the like may also be employed.

In one example, a radio's sampling rate and buffer size are determined based on a channel bandwidth constraint, as previously discussed. One or more combinations of sampling rate and buffer size that generate spectral emission within the predefined channel bandwidth may be implemented in such a radio.

In another example, a radio may use separate channels for transmitting and receiving (e.g., full duplex communication.) The radio may also implement multiple parallel transmission channels to further effect low latency message transmission.

The disclosed technology may be used in combination with fiber-optic, copper, or microwave communication links, either with one transmitter or with more than one transmitters, e.g., controlled by a common transmission controller. In one example, a transmitting device or a receiving device may be coupled to an exchange or Internet Service Provider via fiber-optic, copper, or microwave communication links. In another example, a message transmitted via a RF transmission may be supplemented with a transmission via fiber-optic, copper, or microwave communication links, of additional information associated with the message.

CONCLUSION

While the above Detailed Description describes certain embodiments of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific embodiments disclosed herein, unless the Detailed Description explicitly defines such terms. Accordingly, the actual scope of the technology encompasses not only the disclosed embodiments, but also all equivalent ways of practicing or implementing the technology.

I claim:

1. A method for ionospheric Radio Frequency (RF) transmission of messages in High Frequency (HF) bands to remote receiving devices, the method comprising:
  receiving a message for transmission to a remote receiving device over a frequency in an ionospheric HF frequency band;
  encoding the received message into a format derived to effect message latency;
  determining transmission parameters for transmission of the encoded message in the ionospheric HF frequency band based at least on (a) message latency and on (b) a predefined channel bandwidth; and
  transmitting the encoded message in the ionospheric HF frequency band according to the determined transmission parameters to the remote receiving device, wherein:
  the determined transmission parameters include at least one of a carrier frequency, a modulation type, a transmission power, a sampling rate, and a buffer size;
  the message latency includes a delay component that is based on a propagation delay to the remote receiving device and a size component that is based on a size of the encoded message;
  the predefined channel bandwidth is based on a spectral emission limit for individual channels in the ionospheric HF frequency band;

a contribution to the propagation delay, $\tau$, is calculated according to:

$$\tau = \frac{2Ro}{c} \sum_{1}^{n} \left[ \frac{\sin\frac{d}{2Ro}}{\cos\left(\Delta + \frac{d}{2Ro}\right)} \right] \times 10^3,$$

and wherein
  c is the speed of light, n is a number of hops, d is a length of a hop, $\Delta$ is an elevation angle, and Ro is the radius of the earth.

2. The method of claim 1, wherein the delay component substantially reflects the propagation delay for a path to the remote receiving device, and wherein the size component is linearly proportional to the size of the encoded message.

3. The method of claim 2, wherein the message latency, T, is defined according to:

$$T = \frac{2Ro}{c} \sum_{1}^{n} \left[ \frac{\sin\frac{d}{2Ro}}{\cos\left(\Delta + \frac{d}{2Ro}\right)} \right] \times 10^3 + \tau_1 + \tau_2$$

wherein $\tau 1$ is latency due to message length and $\tau 2$ is latency inherent in components of a communication system for transmission of the encoded message.

4. The method of claim 1, wherein the received message is represented by a first number of bits and the encoded message is represented by a second number of bits, and wherein the second number of bits is less than the first number of bits.

5. The method of claim 1, wherein the received message defines a requested financial transaction.

6. A system for low latency wireless transmission of messages to remote receiving devices, the system comprising:
  means for receiving a message for wireless transmission to a remote receiving device;
  means for determining transmission parameters for the low latency wireless transmission of the message through at least a portion of an ionospheric layer and/or a tropospheric layer based at least on (a) message latency and on (b) a predefined channel bandwidth; and
  means for transmitting the message according to the determined transmission parameters to the remote receiving device through at least a portion of the ionospheric layer and/or the tropospheric layer, wherein:
  the message latency includes a delay component that substantially reflects a propagation delay for a path to the remote receiving device; and
  the delay component, $\tau$, substantially reflects the equation:

$$\tau = \frac{2Ro}{c} \sum_{1}^{n} \left[ \frac{\sin\frac{d}{2Ro}}{\cos\left(\Delta + \frac{d}{2Ro}\right)} \right] \times 10^3$$

where c is based on the speed of light, n is based on a number of hops, d is based on a length of a hop, $\Delta$ is based on an elevation angle, and Ro is based on the radius of the earth.

7. The system of claim 6, further comprising:
  means for encoding the received message to a format derived for relatively low message latency.

8. The system of claim 6, wherein the delay component is based on a path delay between the system and the remote receiving device, and wherein the message latency also includes a size component that is based on a size of the transmitted message.

9. The system of claim 6, wherein the transmission parameters include a carrier frequency, a modulation type, and a transmission power.

10. The system of claim 6, wherein the wireless transmission is one of a ground wave transmission or a sky wave transmission.

11. The system of claim 6, wherein the message represents a request for a financial transaction.

12. The system of claim 6, wherein the predefined channel bandwidth is approximately 2.8 KHz.

13. The system of claim 6, wherein transmitting the message includes transmitting the message without error correction coding, error detection coding, and without encryption.

14. The system of claim 6, wherein the message latency, T, substantially reflects the equation:

$$T = \frac{2Ro}{c} \sum_{1}^{n} \left[ \frac{\sin\frac{d}{2Ro}}{\cos\left(\Delta + \frac{d}{2Ro}\right)} \right] \times 10^3 + \tau_1 + \tau_2$$

where τ1 is based on message length latency and τ2 is based on time-of-flight latency.

15. A device for transmitting messages to remote receiving devices, the device comprising:
   a front end unit adapted to receive a message for wireless transmission to a remote receiving device; and
   a transmission controller adapted to determine transmission parameters for the wireless transmission of the message to the remote receiving device based at least on (a) message latency and on (b) a predefined channel bandwidth, the transmission controller being further adapted to control a transmitter,
   wherein the transmitter is adapted to send the message to the remote receiving device based at least on the determined transmission parameters;
   wherein the message latency includes a delay component that is based on a propagation delay to the remote receiving device and a size component that is based on a size of the message;
   wherein a contribution to the propagation delay, τ, substantially reflects the equation:

$$\tau = \frac{2Ro}{c} \sum_{1}^{n} \left[ \frac{\sin\frac{d}{2Ro}}{\cos\left(\Delta + \frac{d}{2Ro}\right)} \right] \times 10^3;$$

and
   wherein c is based on the speed of light, n is based on a number of hops, d is based on a length of a hop, Δ is based on an elevation angle, and Ro is based on the radius of the earth.

16. The device of claim 15, wherein the transmission controller is further adapted to control at least one other transmitter that is adapted to operate in conjunction with the transmitter to send the message to the remote receiving device based at least on the determined transmission parameters.

17. The device of claim 15, wherein the transmission parameters include a modulation type and at least one of a carrier frequency, a transmission power, a sampling rate, and a buffer size, and wherein the modulation type is one of Minimum Shift Keying, On Off Keying, Frequency Shift Keying, Quadrature Amplitude Modulation, or Phase Shift Keying.

18. The device of claim 15, wherein the determined transmission parameters include a carrier frequency in the High Frequency Spectrum and is between approximately 3 MHz and 30 MHz, and wherein the wireless transmission is an ionospheric transmission.

19. The device of claim 15, wherein the message latency, T, substantially reflects the equation:

$$T = \frac{2Ro}{c} \sum_{1}^{n} \left[ \frac{\sin\frac{d}{2Ro}}{\cos\left(\Delta + \frac{d}{2Ro}\right)} \right] \times 10^3 + \tau_1 + \tau_2$$

where τ1 is based on message length latency and τ2 is based on time-of-flight latency.

20. The device of claim 15, wherein front end unit is also adapted to encode the message into a sequence of bits according to information stored in a look up table.

* * * * *